Figure 1:
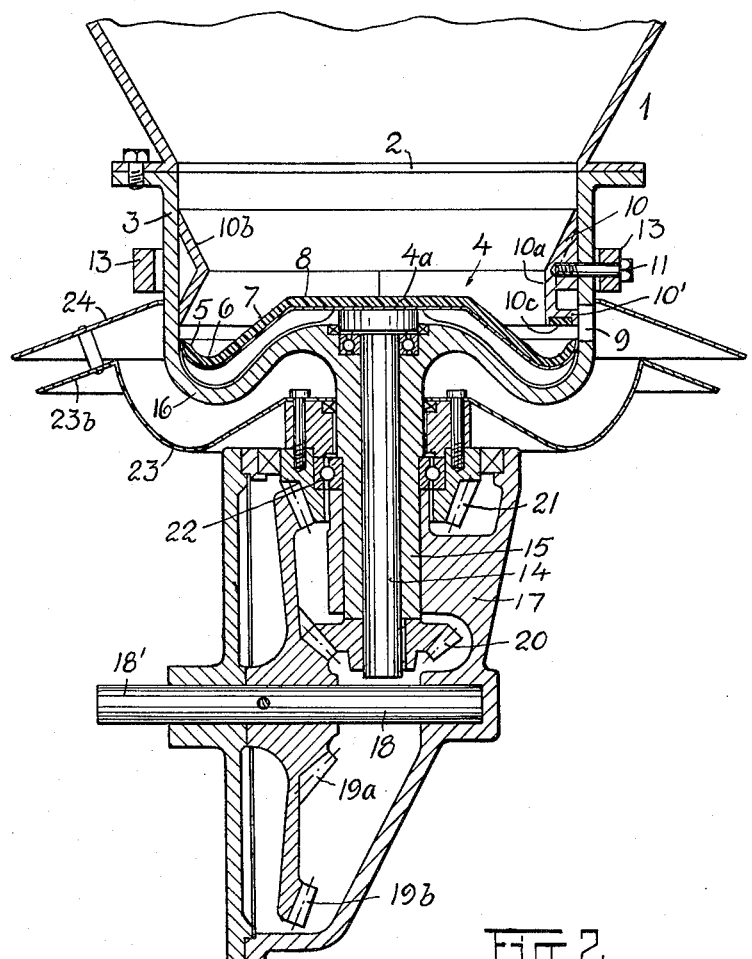

June 12, 1962 S. STOKLAND 3,038,729
APPARATUS FOR DISTRIBUTING FERTILIZER
OR OTHER GRANULAR MATERIAL
Filed Dec. 2, 1959

INVENTOR
SIGMUND STOKLAND
BY
HIS AGENT 3,038,729
APPARATUS FOR DISTRIBUTING FERTILIZER OR
OTHER GRANULAR MATERIAL
Sigmund Stokland, Nygards Alle 3, Oslo, Norway
Filed Dec. 2, 1959, Ser. No. 856,790
Claims priority, application Norway Dec. 3, 1958
6 Claims. (Cl. 275—15)

The present invention relates to an apparatus for distributing fertilizer or other granular material of the type wherein a container for the material to be distributed is positioned above a distributing member mounted for rotation about a vertical axis and wherein means are provided for feeding material from the container to said distributing member.

More particularly the invention relates to improvements in an apparatus of the type disclosed in my copending application Serial No. 723,741, filed March 25, 1958, now United States Patent No. 2,958,531, and including a mouth-piece having an upper end communicating with an outlet of the container, a circumferential wall defining at least one regulatable opening, and a lower end surrounding an upwardly diverging feeding cup rotatable about a vertical axis and having an upper end near to and beneath each said opening, and in which rotatable distributing means is provided coaxial with and disposed about said cup and means for rotating the cup and distributing means whereby the material passing from the container through the mouth-piece and into the cup is caused to flow upwardly therein through each said opening and is spread by the distributing means when the cup and distributing means rotate.

Experience has shown that a machine as hereinbefore defined generally operates satisfactorily. If, however, the material to be distributed is moist, and/or is compressed in the lower portion of the cup-like feeding member, due to the pressure of material lying above it in the feeding member, the moist and/or compressed material tends to rotate relative to the interior surface of the feeding member so that the centrifugal force which acts on said material for feeding the same when the machine is operating, is reduced, whereby the material is fed to the distributing member at an uneven rate.

It has further been observed that when material of the consistency of raw phosphate and the like, is distributed in a machine as hereinbefore defined, such material tends to adhere to and build up on the inner effective surface of the feeding member if such surface is metallic, so as also to cause the material to be fed at an uneven rate.

According to the present invention there is provided a machine as hereinbefore defined, wherein the feeding member has an upwardly convergent arched or dome-like central portion, the top of which portion projects above the edge of said side wall of the feeding member.

In a preferred embodiment of the invention said central portion is frusto-conical and is mechanically connected to said side wall via an intermediate upwardly concave portion, the upper surface of the frusto-conical central portion projecting upwardly of said edge.

The inner surface of the feeding member is advantageously composed of a resilient or extensible material such as synthetic thermoplastic, rubber, or the like, which is capable of yielding locally to the pressure thereon of the material to be distributed.

Figure 2:
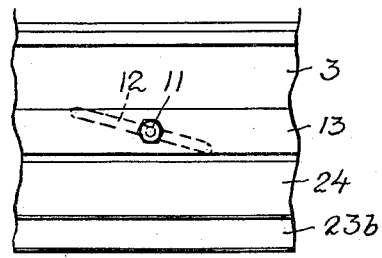

For a better understanding of the present invention and to show how the same may be carried into effect reference will now be made to the accompanying drawing in which like designations indicate like parts and in which, FIGURE 1 is a vertical, axially sectional view of the machine with part thereof removed, and FIGURE 2 is a fragmentary side view, as seen from the right hand side in FIGURE 1.

A funnel-shaped lower portion 1 of a storage container for the material to be distributed, has an outlet opening 2 communicating with a cylindrical mouth member 3 the lower portion of which member encircles a cup-like feeding member, generally designated 4, the feeding member being mounted for rotation about a vertical axis.

The bottom of the feeding member 4 is formed with a frusto-conical or dome-like central portion having upwardly convergent side walls, the top of the frustum or dome projecting upwardly of the edge of the rim of the cup-like feeding member. The said side walls of the central portion are connected to the upwardly divergent walls of the cup-like feeding member via an annular upwardly concave portion.

In the preferred embodiment shown in the drawing said central portion is shaped as the frustum of a cone, the side wall 7 of which is mechanically connected via an annular upwardly concave portion 6 to a circumferential upwardly divergent rim portion 5 of the member 4. The flat top 8 of the central portion is disposed in a plane above that of the edge of said rim portion 5.

The wall of the cylindrical mouth-member 3 has therein at least one slit-shaped opening 9, the lower edge of which opening is approximately level with the edge of the rim portion 5 of the feeding member 4.

An annular member 10 is mounted so as to be vertically adjustable within the mouth member 3 and is provided, along a portion of the lower circumference thereof, with a radially extending flange 10′ arranged so that the extent of the free area of the opening 9 may be regulated by displacing the annular member 10 in the vertical direction.

For adjusting the member 10, as aforesaid, a number of, for example three, bolts 11 are evenly distributed about the circumference of the member 10, each bolt 11 projecting through a corresponding oblique slit 12 formed in the wall of the mouth member 3 (FIG. 2). The bolts 11 are secured in a ring 13 surrounding the mouth member 3, so that when the ring 13 is rotated about its axis, the bolts 11 are displaced in the slits 13, thus displacing vertically the annular member 10.

The upper wall 10b of the annular member 10 diverges upwardly as shown, so that material flowing from the container 1 through the outlet 2 thereof is directed by the inner surface of the wall 10b towards the outer surface of the wall 7 of the central portion of the feeding member 4. The material flowing from the container 1 does not thus directly flow against, so as to compress the material resting on the inner surface of the rim portion 5, which material is to be fed through the opening 9. That portion of the annular member 10 on which the flange 10′ is arranged has an inner cylindrical surface 10a having a diameter which is smaller than the greatest inner diameter of the member 10.

The feeding member 4 is fixedly attached to the upper end of a shaft 14 which is supported for rotation about a vertical axis in a bush 15 connected to the lower end of the mouth member 3 by means of arms or (as shown) by means of an annular portion 16 corresponding generally to the shape of the lower surface of the feeding member 4. The bush 15 is supported in a gear box 17 carried by the frame (not shown) of the machine.

In the gear box 17 is rotatably supported a driving shaft 18, the forward end 18′ of which shaft projects from the gear box 17 and may be connected to the power output shaft of a tractor when the machine is mounted on such. The shaft 18 carries a bevel gear 19 having two concentric gear wheel surfaces, an inner gear wheel surface 19a and an outer gear wheel surface 19b.

The inner surface 19a meshes with a bevel gear 20 fixed to the lower end of the shaft 14 and the surface 19b meshes with a bevel gear wheel 21 rotatably carried by a ballbearing 22 on the bush 15. The bevel gear 21 carries on the upper end thereof a distributing member comprising a cup-shaped member 23 shaped generally in conformance with the lower surface of the annular portion 16, and having along the upper edge thereof an outwardly and downwardly projecting flange 23b. Above the member 23 and parallel with the flange 23b thereof is mounted an annular shield 24 fixedly secured to the member 23 and serving in cooperation therewith to guide material ejected from the machine at a fixed angle relative to the ground regardless of the speed at which the feeding member 4 rotates.

By means of the above described gearing means, the distributing member 23, 23b is imparted a desired rotational speed from the shaft 18 via the bevel gear wheel surface 19b and gear wheel 21, the feeding member 4 being caused to rotate at a predetermined lower speed than the member 23, 23b via the gear wheel surface 19a and gear wheel 20.

When the material to be distributed flows from the container 1 through the outlet 2 thereof the inclined inner surface of the wall 10b of the annular member 10 directs the material inwardly towards the axis of the mouth-member 3 in the direction of the outer surface of the wall 7 of the central portion of the feeding member 4 so that the material, which is imparted a rotatory movement slides downwardly along the last mentioned surface and onto the inner upwardly divergent surface of the rim portion 5 along which surface the material flows upwardly, and out through the opening 9 to the distributing member 23, 23b.

There is thus achieved a drop in the pressure of the material, in the outer circumferential region of the feeding member 4, particularly in the vicinity of the opening 9, and simultaneously an increased rotational effect on the material in the central part of the mouth member 3, whereby feeding of material in a predetermined quantity and at an even rate is obtained without any appreciable influence being exerted by variations in the consistency of the material.

In order to prevent the material to be distributed from adhering to and building upon the operative surface of the feeding member 4, said surface is composed of a resilient or extensible material, such as synthetic thermoplastic material, rubber or the like.

The feeding member 4 is thus provided with a relatively thick layer or coating 4a of said material, the elasticity of which material is so chosen that the surface thereof can yield locally to the pressure of the material to be distributed.

Instead of providing the feeding member 4 with a coating of said resilient or extensible material the feeding member may be composed of such material. In this case the feeding member is provided with reinforcing means embedded therein so that the member retains its desired shape.

In order to prevent adhesion of the material to be distributed to the lower face of the flange 10', said face may be provided with a recess filled with a resilient or extensible material (10c) such as has been above referred to.

I claim:

1. An apparatus for distributing granular and like materials comprising, in combination: a container for receiving a supply of material, the container having an outlet; a tubular mouth-piece having an upper end in communication with said outlet, a circumferential wall defining at least one opening, and a lower end; a feeding member rotatable about a substantially vertical axis having an upwardly diverging annular rim portion axially adjacent said opening, an upwardly convergent central portion, and an intermediate upwardly concave annular portion connecting said central portion to said rim portion, said central portion being frusto-conical, and the upper plane surface of said central portion projecting above the edge of said rim portion, said feeding member being surrounded by the lower end of said mouth-piece, rotatable distributing means coaxial with and disposed about said feeding member and said wall; means for rotating said feeding member and said distributing means; and guide means secured to said mouth-piece for directing the material passing from said container through said mouth-piece against said central portion, and away from said rim portion, whereby the material is caused to slide along the surface thereof and onto the upwardly divergent rim portion to flow upwardly thereof and through said opening and is spread by said distributing means when said member and said distributing means rotate.

2. An apparatus for distributing granular and like materials comprising, in combination: a container for receiving a supply of materials, the container having an outlet; a tubular mouth-piece having an axis, an axial upper end in communication with said outlet, a lower axial end, and a circumferential wall intermediate said ends and defining at least one radial opening; an annular member having an upwardly divergent inner bore disposed coaxially in said mouth-piece, adjacent said wall, a feeding member rotatable substantially about said axis, said feeding member having an upwardly diverging annular rim portion aligned with said annular member and adjacent said opening, an upwardly convergent central portion aligned with said bore, and an intermediate upwardly concave annular portion connecting said central portion to said rim portion, said central portion being frusto-conical, and the upper plane surface of said central portion projecting above the edge of said rim portion, said feeding member being surrounded by the lower end of said mouth-piece, rotatable distributing means coaxial with said feeding member and disposed about said wall; and means for rotating said feeding member and said distributing means whereby the material passing from said container through said mouthpiece is directed by said annular member against said central portion to slide along the surface thereof and onto the upwardly divergent surface to flow upwardly thereof and through said opening and is spread by said distributing means when the latter and said feeding member rotate.

3. An apparatus according to claim 2, in which the said annular member is displaceable axially of the mouth piece for regulating the extent of the free area of said radial opening of the mouth piece.

4. An apparatus according to claim 2 in which the annular member has extending, at least over a portion of the circumference thereof and at the lower end thereof, a flange extending inwardly of the annular member and capable of being brought into radial alignment with said opening.

5. An apparatus according to claim 4, in which the lower surface of the flange is coated with a resilient material capable of yielding locally to the pressure of the material to be distributed.

6. An apparatus for distributing granular and like materials comprising in combination: a container for receiving a supply of material, the container having an outlet; a tubular mouth-piece having an upper end in communication with said outlet, a circumferential wall defining at least one opening, and a lower end; a feeding member rotatable about a substantially vertical axis, said member having an operative face portion composed of a resilient material adapted to yield locally to the pressure thereon of the material to be distributed, said feeding member having an upwardly diverging annular rim portion axially adjacent said opening, an upwardly convergent central portion, and an intermediate upwardly concave annular portion connecting said central portion to said rim portion, said central portion being frusto-conical, and the upper plane surface of said central portion projecting above the edge of said rim portion, said feeding member being surrounded by the lower end of said mouth-piece, rotatable distributing means coaxial with and disposed about said feeding member and said wall, means for rotating said feeding member, means for rotating said distributing means at a rotary speed greater than that of said member, and guide means secured to said mouth piece for directing the material passing from said container through said mouth-piece toward said central portion and away from said rim portion of said feeding member to flow from said central portion upwardly along the rim portion through said opening and to be spread by said distributing means when said member and said distributing means rotate.

References Cited in the file of this patent

UNITED STATES PATENTS

| | | |
|---|---|---|
| 350,821 | Field | Oct. 12, 1886 |
| 423,997 | Henrichsen | Mar. 25, 1890 |
| 1,103,768 | Hermens | July 14, 1914 |
| 1,166,477 | Parrish | Jan. 4, 1916 |
| 1,566,493 | McKay | Dec. 22, 1925 |

FOREIGN PATENTS

| | | |
|---|---|---|
| 200,539 | Australia | Dec. 9, 1955 |
| 375,769 | France | May 22, 1907 |
| 794,478 | Great Britain | May 7, 1958 |